United States Patent [19]
Igarashi

[11] Patent Number: 4,597,374
[45] Date of Patent: Jul. 1, 1986

[54] CONSTRUCTION OF A HEATING COMPARTMENT FOR COOKING APPARATUS

[75] Inventor: Noboru Igarashi, Nara, Japan

[73] Assignee: Sharp Kabushiki Kaisha, Osaka, Japan

[21] Appl. No.: 387,439

[22] Filed: Jun. 11, 1982

[30] Foreign Application Priority Data

| | | | |
|---|---|---|---|
| Jun. 16, 1981 | [JP] | Japan | 56-89063[U] |
| Jun. 16, 1981 | [JP] | Japan | 56-89064[U] |
| Jun. 16, 1981 | [JP] | Japan | 56-89065[U] |
| Jun. 16, 1981 | [JP] | Japan | 56-89066[U] |
| Jun. 16, 1981 | [JP] | Japan | 56-89067[U] |
| Jun. 16, 1981 | [JP] | Japan | 56-89068[U] |
| Sep. 14, 1981 | [JP] | Japan | 56-137761[U] |

[51] Int. Cl.[4] .......... A21B 1/00
[52] U.S. Cl. .......... 126/19 R; 220/77; 219/10.55 D
[58] Field of Search .......... 126/19 R, 21 R, 275 R, 126/273.5, 273 R, 273 A; 29/243.5, 283.5; D7/406, 407, 409; 220/72, 77, 78, DIG. 25, 4 R, 4 F; 219/10.55 D, 10.55 R

[56] References Cited

U.S. PATENT DOCUMENTS

| | | | |
|---|---|---|---|
| 12,671 | 6/1908 | Black | 220/77 |
| 386,765 | 7/1888 | Atkinson | 220/77 |
| 508,237 | 11/1893 | Pierce | 220/77 |
| 1,023,577 | 4/1912 | List et al. | 220/4 F |
| 2,625,290 | 1/1953 | Kice et al. | 220/72 |
| 3,159,156 | 12/1964 | Incledon | 126/19 R |
| 3,547,299 | 12/1970 | Kepple | 220/72 |

FOREIGN PATENT DOCUMENTS

| | | | |
|---|---|---|---|
| 2229930 | 1/1975 | France | 126/19 R |
| 2029180 | 8/1978 | United Kingdom | 219/10.55 R |

*Primary Examiner*—Samuel Scott
*Assistant Examiner*—Noah P. Kamen
*Attorney, Agent, or Firm*—Birch, Stewart, Kolasch & Birch

[57] ABSTRACT

A plurality of plate elements are curled with one another to provide a heating compartment for a cooking apparatus including a microwave oven. The plate elements have ends which are curled to a circular form and may include a front plate, a base plate having two side walls, and a top plate containing a back plate. In another specific form of the present invention, such plate elements are the front plate, the base plate having the side walls, the back plate and a separate top plate.

10 Claims, 20 Drawing Figures

CONSTRUCTION OF A HEATING COMPARTMENT FOR COOKING APPARATUS

BACKGROUND OF THE INVENTION

The present invention relates to a cooking apparatus and, more particularly, to construction of a heating compartment of a cooking apparatus including a microwave oven.

To form a conventional heating compartment of a cooking apparatus including a microwave oven, a plurality of assembly elements are joined with one another by projection or spot welding. Consequently, leakage of microwaves from the conventional heating compartment might occur through the gap between the welds in spot welding, or detached welds in projection welding owing to variation in the hight of the projections. Vapor from a heated foodstuff might also leak through the projections.

Therefore, it is desired to provide an improved heating compartment which eliminates the above described problems.

SUMMARY OF THE INVENTION

Accordingly, it is an object of the present invention to provide an improved heating compartment of a cooking apparatus including a microwave oven.

It is another object of the present invention to provide an improved heating compartment of a cooking apparatus including a microwave oven, the compartment comprising elements joined together by a curling operation for forming the ends of a workpiece into a circular cross section.

Briefly described, in accordance with the present invention, a plurality of plate elements are curled with one another to provide a heating compartment of a cooking apparatus including a microwave oven curling the ends of each workpiece into a form with a circular cross section. The compartment comprises three or four individual plate elements.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

The present invention will be described in terms of a microwave oven, but it is not limited to this type of cooking apparatus. The present invention can be applied to any other type of cooking apparatus.

Figure 1:
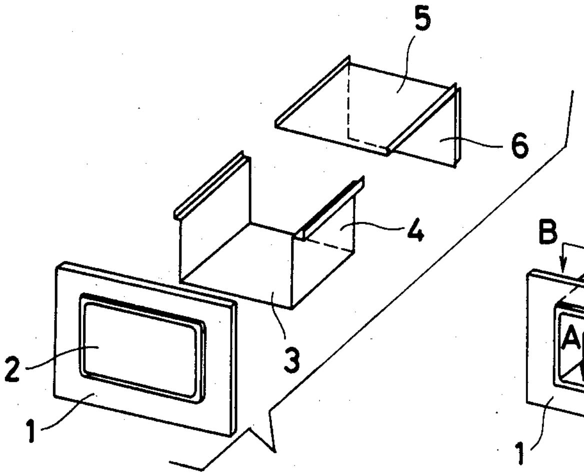
FIG. 1 shows a perspective view of elements forming a heating compartment of a cooking apparatus according to a preferred embodiment of the present invention.
Figure 2:
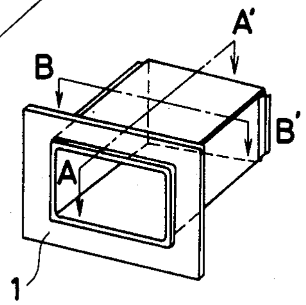
FIG. 2 shows a perspective view of the heating compartment assembled from the elements of FIG. 1.
Figure 3A:
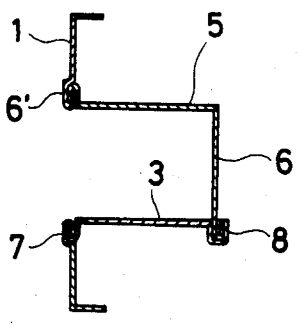
FIGS. 3(*a*) and 3(*b*) show cross sectional views of the compartment of FIG. 2, taken along the lines A—A' and B—B', respectively.
Figure 3B:
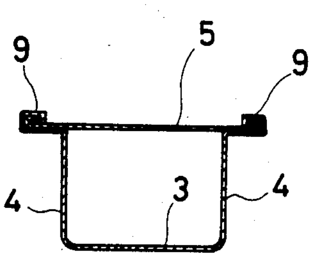

FIG. 1 shows a perspective view of plate elements forming a heating compartment (oven cavity) of a microwave oven according to a preferred embodiment of the present invention. FIG. 2 shows a perspective view of the heating compartment assembled with the plate elements of FIG. 1. FIGS. 3(*a*) and 3(*b*) show cross sectional views of the compartment of FIG. 2, taken along the lines A—A' and B—B', respectively.

With reference to these drawings, 1 indicates a front plate containing a window 2 through which a foodstuff is placed into and taken out of the heating compartment. 3 indicates a U-shaped plate functioning as a base plate having two side walls 4. 5 indicates a top plate and 6 indicates a rear plate. The top plate 5 and the rear plate 6 are provided as an L-shaped plate.

As shown in FIGS. 3, (*a*-*b*), the compartment comprises a joint 6' between the front plate 1 and the top plate 5, a further joint 7 between the front plate 1 and the base plate 3, a further joint 8 between the base plate 3 and the back plate 6, and a further joint 9 between the top plate 5 and each of the side walls 4. The joints are all curled according to the present invention. Curling forms the ends of each panel into a curled on form with a circular cross section.

In the FIG. 1 embodiment of the present invention, three plate elements forming the compartment are provided, namely the front plate 1, the base plate 3 having the side walls 4, and the top plate 5 having the back plate 6. All joints between any two of these three elements are curled.

Since the back plate is combined with the top plate, it is unnecessary to join the back plate with by drawing as in the conventional case, so that break may not occur due to drawing. Thus, manufacturing efficiency of the compartment can be improved with low cost.

Figure 4:
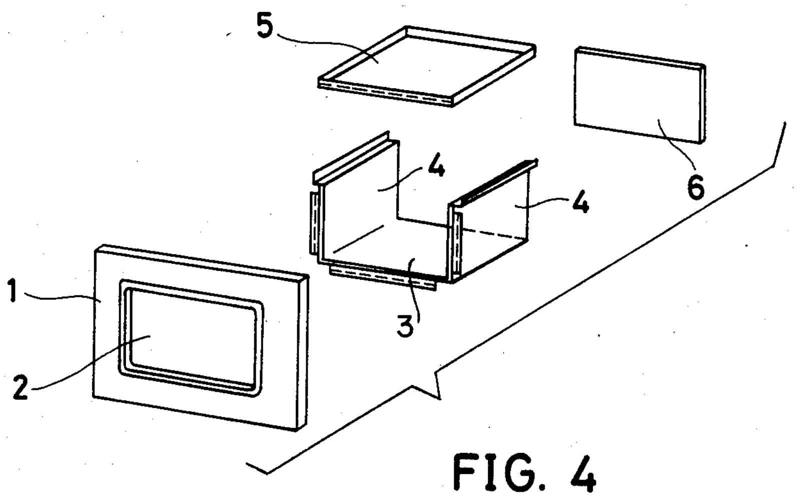
FIG. 4 shows a perspective view of the elements forming the heating compartment according to another preferred embodiment of the present invention.
Figure 5A:
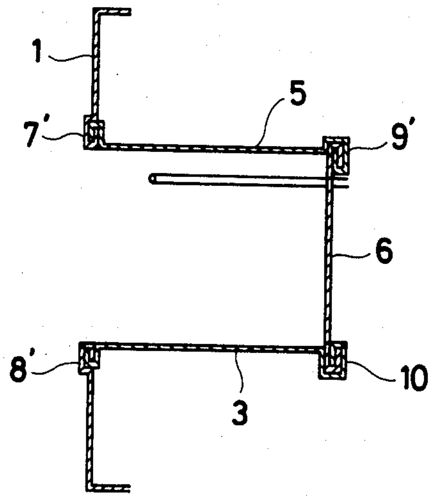
FIGS. 5(*a*) and 5(*b*) show cross sectional views of the compartment as formed from the elements of FIG. 4, taken along directions similar to the lines A—A' and B—B' of FIG. 2.
Figure 5B:
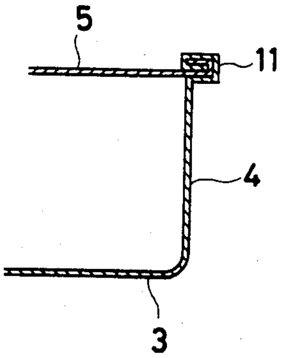

FIG. 4 shows a perspective view of the plate elements forming the heating compartment according to another preferred embodiment of the present invention. FIGS. 5(*a*) and 5(*b*) show cross sectional views of the compartment formed with the elements of FIG. 4, taken along directions similar to the lines A—A' and B—B' of FIG. 2, respectively, similar to FIGS. 3(*a*) and 3(*b*).

With reference to FIGS. 4, 5(*a*) and 5(*b*), like elements corresponding to those of FIGS. 1, 2, 3(*a*) and 3(*b*) are indicated by like numerals except that the preferred embodiment of FIGS. 4, 5(*a*) and 5(*b*) is comprised of four individual plates while the embodiment of FIGS. 1, 2, 3(*a*) and 3(*b*) is comprised of three individual plates.

The back plate 6 is separate from the top plate 5 in FIG. 4. The elements of FIG. 4 are joined with one another to shape the heating compartment similar to that shown in FIG. 2. As FIGS. 5(*a*) and 5(*b*) show, this embodiment includes a joint 7' between the front plate 1 and the top plate 5, a further joint 8' between the front plate 1 and the base plate 3, a further joint 9' between the top plate 5 and the back plate 6, a further joint 10 between the base plate 3 and the back plate 6, and a further joint 11 between the top plate 5 and the base plate 3. Each joint is curled.

In this preferred embodiment of the present invention, four plate elements forming the compartment are provided, namely the front plate 1, the base plate 3 having the side walls 4, the top plate 5 and the back plate 6. All joints between any two of these four elements are curled.

A self-cleaning coating can be applied to the surface of the base plate 3 and/or the top plate 5. The self-cleaning coating functions to catalytically oxidize and remove cooking residues, oil and fat, etc deposited on these surfaces.

Figure 6:
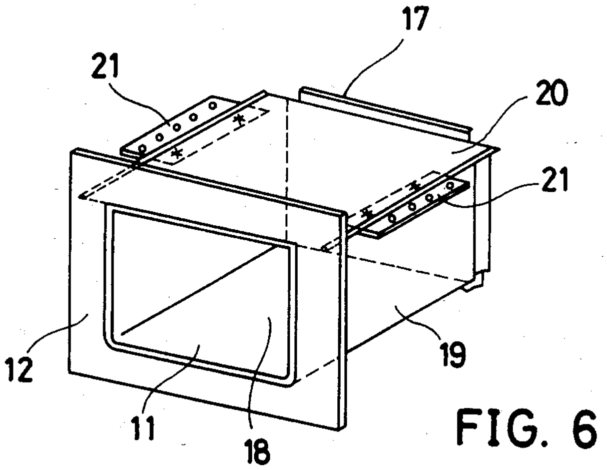
FIG. 6 shows a perspective view of the heating compartment according to a further preferred embodiment of the present invention.
Figure 7:
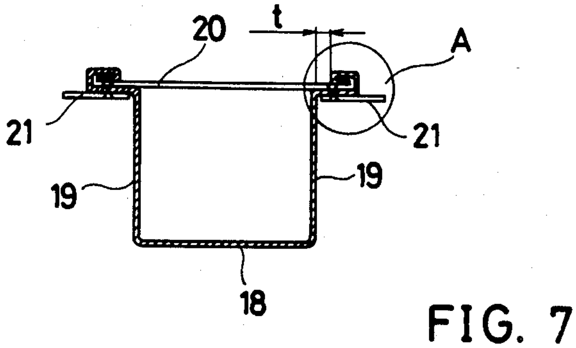
FIG. 7 shows a cross sectional view of the compartment of FIG. 6.

FIG. 6 shows a perspective view of the heating compartment according to a further preferred embodiment of the present invention. FIG. 7 shows a cross sectional view of the compartment of FIG. 6.

12 indicates a front plate containing a window 11 through which foodstuff may be placed into and taken out of the compartment. A back plate 17, a U-shaped base plate 18 having two side walls 19, and a top plate 20 are joined by curling. FIG. 7 shows a joint "A" between the base plate 18 and the top plate 20 in a cross section.

Tap plates 21 having screw holes therein are welded onto each joint "A" curled between the base plate 18 and the top plate 20. Each tap plate is rectangular. On the tap plates 21, angles for supporting some mechanical parts of the microwave oven such as levers can be attached using the screw holes. The dimension "t" in the joint "A" is a spot margin defining the position at which the tap plates 21 are welded. "t" is a width of about 10 mm.

Since the tap plates are disposed adjacent the compartment, the mechanical parts can be positioned near the compartment. The manufacture and the productivity can be enhanced. The space around the compartment can be highly utilized.

Figure 8:
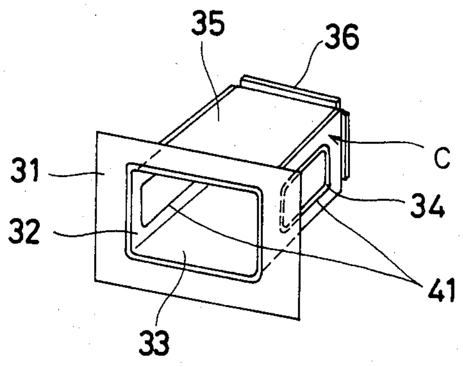
FIG. 8 shows a perspective view of the compartment according to a further preferred embodiment of the present invention.
Figure 9:
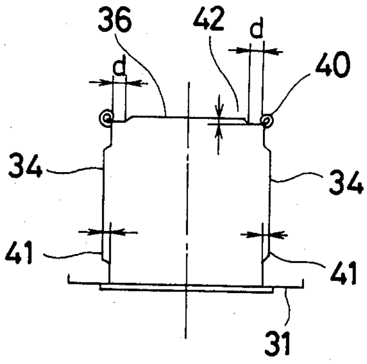
FIG. 9 shows a plan view of the compartment of FIG. 8.
Figure 10:
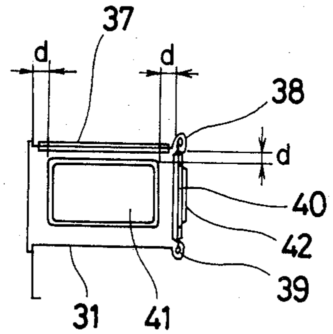
FIG. 10 shows a side view of the compartment of FIG. 8.

FIG. 8 shows a perspective view of the compartment according to another further preferred embodiment of the present invention. FIG. 9 shows a plan view of the compartment of FIG. 8 and FIG. 10 shows a side view of the compartment of FIG. 8.

31 indicates a front plate containing a window 32 through which the foodstuff may be placed into and taken out of the compartment. 33 indicates a U-shaped base plate having side walls 34. 35 indicates a top plate and 36 indicates a back plate. 37 represents a curled joint between the top plate 35 and each of the side walls 34 of the base plate 33. 38 is a curled joint between the top plate 35 and the back plate 36. 39 is a curled joint between the base plate 33 and the back plate 36. 40 is a curled joint between the back plate 36 and each of the side walls 34.

41 is a drawn portion formed in the side walls 34. The depth of the drawn portion 41 is about 2–5 mm. The drawn portion 41 is positioned back from the side of the curled joints at a distanced of about 30 mm. 42 indicates another drawn portion formed in the back plate 36, having a depth of about 2–5 mm. The drawn portion 42 is positioned back from the side of the curled joints at the distanced of about 30 mm, as in the case of the drawn portion 41 on the side walls 41.

When stress of about 20 $kg/cm^2$ is applied in the direction of "C" of FIG. 8 to the side walls 34 in the compartment with the drawn portions 41 and 42 the compartment is not damaged at all.

Thus, the provision of the drawn portion enhances the strength of the compartment comprising the curled joints.

Figure 11:
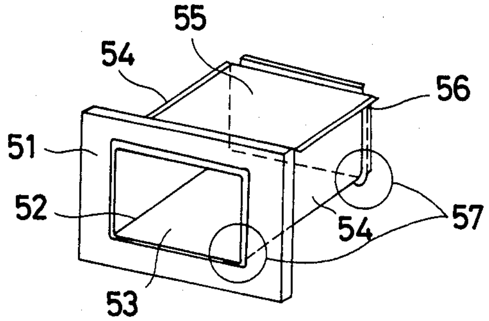
FIG. 11 shows a perspective view of the compartment according to a further preferred embodiment of the present invention.
Figure 12:
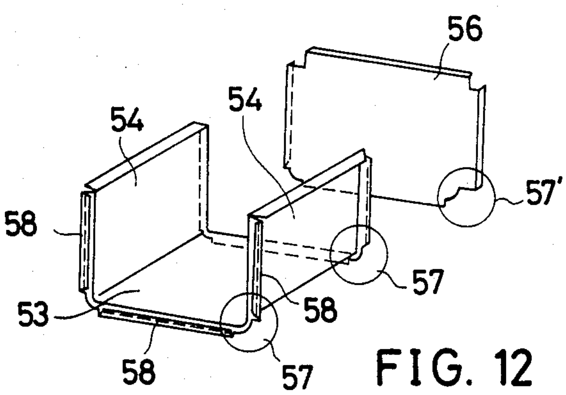
FIG. 12 shows a perspective view of the elements forming the compartment of FIG. 11.
Figure 13:
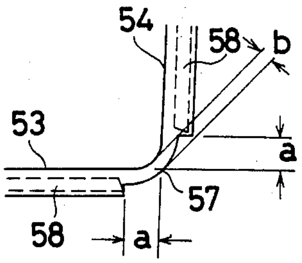
FIG. 13 shows an enlarged view of a base plate of the compartment of FIG. 11.

FIG. 11 shows a perspective view of the compartment according to a further preferred embodiment of the present invetion. FIG. 12 shows a perspective view of the elements forming the compartment of FIG. 11. FIG. 13 shows an enlarged view of a base plate of the compartment of FIG. 11.

51 indicates a front panel containing a window 52 through which the foodstuff can be placed into and taken out of the compartment. 53 indicates a U-shaped base plate having two side walls 54. 55 indicates a top plate, 56 indicates a back plate, and 57 indicates a bent portion of the base plate 53, having a length of 2*a*. 57' indicates a portion of the back plate 56 stressed toward the bend portion 57. 58 indicates a curling margin for curling the front plate 51 and the base plate 53.

As FIG. 13 shows, the bent portion 57 of length 2*a* has a width of b and the curling margin is absent. While the front plate 51 and the base plate 53 are curled at the curling margin 58, the base plate 53 and the front plate 51 are stressed or pressed together at the bent portion 57. At the bent portion 57, the back plate 56 and the base plate 53 are not curled, but only stressed.

The following TABLE shows a relation between the width of b of the bent porion 57 and an amount of leakage of microwave P ($mw/cm^2$).

TABLE

| b (mm) | 0 | 1 | 2 | 3 | 4 | 5 | 6 |
|---|---|---|---|---|---|---|---|
| P ($mw/cm^2$) | 3.5 | 1.3 | 0.4 | 0.05 | 0.05 | 0 | 0 |

The above TABLE indicates that leakage of microwave becomes substantially zero when the bent portion 57 has a width of 3 mm or more.

Figure 14:
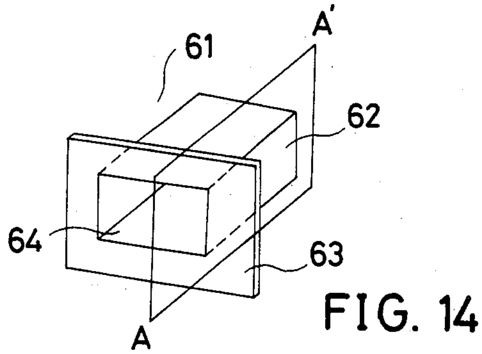
FIG. 14 shows a perspective view of the heating compartment according to a further preferred embodiment of the present invention.
Figure 15:
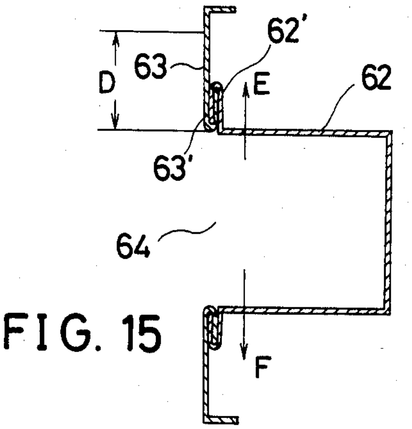
FIG. 15 shows a sectional view of the compartment of FIG. 14, taken along the line A—A'.
Figure 16:
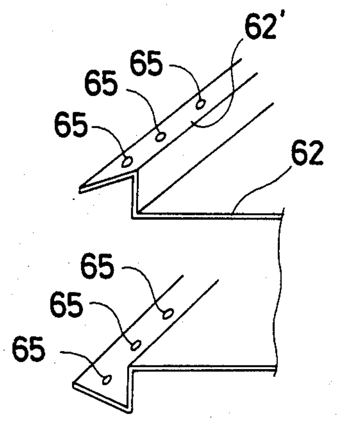
FIG. 16 shows an enlarged perspective view of part of the compartment of FIG. 14.
Figure 17:
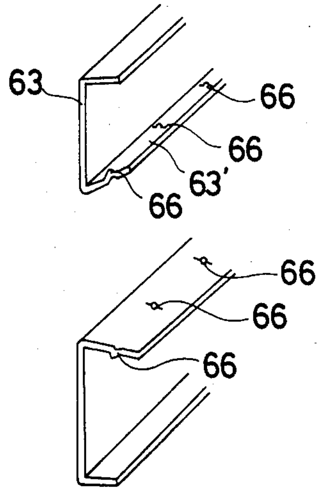
FIG. 17 shows an enlarged perspective view of a front plate of the compartment of FIG. 14.

FIG. 14 shows a perspective view of the compartment according to a further preferred embodiment of the present invention. FIG. 15 shows a sectional view of the compartment of FIG. 14, taken along A—A'. FIG. 16 shows an enlarged perspective view of part of the compartment of FIG. 14. FIG. 17 shows an enlarged perspective view of the front plate in the compartment of FIG. 14.

61 indicates a heating compartment. 62 indicates a box for providing the compartment 61. 63 indicates a plate positioned in front of a front window 64 of the box 62.

62' is a bent portion extending from the front of the compartment 62. A plurality of apertures 65 are formed in the bent portion 62' with a pitch of about 20 mm. 63 indicates another bent portion formed around the window 64 of the front plate 63. The bent portion 63' contains a plurality of projections 66 corresponding to positions of the apertures 65.

While the projections 66 on the bent portion 63' are aligned with the apertures 65 in the bent portion 62', the front plate 63 is curled with the ends of the box 63 to fix the front plate 62 to the box 62 as shown in FIG. 15.

The projections 66 cooperate with the apertures 65, so that the compartment can resist a mechanical stress of about 5.4 $Kg/cm^2$ determined from experiment. This strength is an improvement of about 70% as compared with the conventional case in which the projection-aperture combinations are absent.

To accomplish the same result as the above, it may be possible that the projections are formed on the bent portion 62' of the box 62 and the apertures are provided on the bent portion 63' of the front plate 63.

"D" in FIG. 15 indicates an area for a joint between the front plate 63 and a door seal plate (not shown) of the compartment 61. A joint area between the front plate 63 and the door seal plate can be made wide, so that the sealing effect against leakage is increased. Drawn components are placed in front of the oven compartment, to enhance productivity in conducting finishing treatment.

This preferred embodiment prevents separation of the elements in the direction of "E" and "F" in FIG. 15. Without the curling operation, the box 62 can thus be tightly combined with the front plate 63. Also, the strength of the projection-aperture combination can be added to the strength realized by curling the plate elements.

Figure 18:
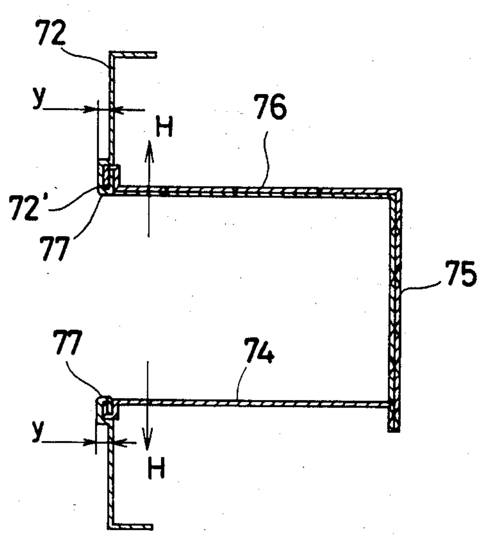
FIG. 18 shows a cross sectional view of the compartment according to still a further preferred embodiment of the present invention.

FIG. 18 shows a cross sectional view of the compartment according to still a further preferred embodiment of the present invention.

71 indicates a front plate. 72' indicates an inner edge of the front plate 72. 74 represents a U-shaped base plate. 75 is a back plate and 76 is a top plate. The top plate 76 and the back plate 75 are provided by a single plate similar to that of FIG. 1.

77 is a drawn portion formed at the edge 72' of the front plate 72. It extends forwardly a distance y (about several mm) from the front plate 72.

The ends of the base plate 74, and the top plate 76 are curled with the edge 72'. The side walls connected to the base plate 74 are spot-welded with the top plate 76.

Since the drawn portion 77 projects from the front plate 72 by several mm, the curled portions are positioned inside the drawn portion 77, to prevent pulling out of the base plate 74 and the top plate 76 in the direction of "H" in FIG. 18. Over the whole of the edge 72', microwave leakage is prevented.

This arrangement enables embossing on the curled portions to be omitted while preventing microwave leakage.

While only certain embodiments of the present invention have been described, it will be apparent to those skilled in the art that various changes and modifications may be made therein without departing from the spirit and scope of the invention as claimed.

What is claimed is:

1. A heating compartment for treating foods with microwaves in a microwave cooking apparatus, comprising:
   - a plurality of panel elements defining sides of said compartment joined together along mutually adjacent edges whereat two of said panels meet, said edges being joined by curling said edges about each other for interlocking said edges;
   - said compartment comprising at least one corner whereat three of said sides meet;
   - two of said sides comprising a substantially continuous portion substantially perpendicular to both said two sides and defining a flange extending about said corner and at least an adjoining surface defined by a third side stressed against said flange for sealing said corner against leakage of microwaves from said compartment.

2. A compartment as in claim 1, wherein said adjoining surface is parallel to said flange.

3. A compartment as in claim 1 wherein a first panel element comprises said portion defining said flange and a second panel element comprises said adjoining surface.

4. A compartment as in claim 1 wherein a first panel element comprises two of said three sides and said portion defining said flange, and a second panel element comprises one of said three sides and said adjoining surface.

5. A compartment as in claim 1, wherein said flange has a width of at least 3 mm.

6. A compartment as in claim 1, wherein said flange and said adjoining surface are maintained in contact with each other by said interlocking of said edges of said panel elements.

7. A compartment as in claim 1, wherein said flange and said adjoining surface are devoid of curled interlocked edges.

8. The compartment of claim 1, further comprising a tap plate comprising holes for mounting additional elements secured to at least one plate element adjacent a curled interlocked edge thereof.

9. The compartment of claim 8, wherein said compartment comprises a top plate and a base plate which are curled together, and said tap plate is secured adjacent the curled joint between the top plate and the base plate.

10. The compartment of claim 8, wherein said tap plate is welded to the at least one panel.

* * * * *